United States Patent [19]

Amason et al.

[11] Patent Number: 4,796,153
[45] Date of Patent: Jan. 3, 1989

[54] LIGHTNING DIVERSION STRIPS FOR AIRCRAFT

[75] Inventors: Myron P. Amason, Stanton; John E. Schroeder, Huntington Beach; Evert C. Alsenz, Newport Beach, all of Calif.

[73] Assignee: Lightning Diversion Systems, Huntington Beach, Calif.

[21] Appl. No.: 57,350

[22] Filed: Jun. 1, 1987

[51] Int. Cl.[4] .......................... B64D 45/02; H05F 3/00
[52] U.S. Cl. ..................................... 361/218; 244/1 A
[58] Field of Search ............... 244/1 A, 121; 361/117, 361/118, 218, 212, 216, 217, 220

[56] References Cited

U.S. PATENT DOCUMENTS

| Re. 25,417 | 7/1963 | Amason . | |
|---|---|---|---|
| 3,416,027 | 12/1968 | Amason et al. . | |
| 4,237,514 | 12/1980 | Cline . | |
| 4,445,161 | 4/1984 | Brick . | |
| 4,479,163 | 10/1984 | Bannink et al. | 244/1 A |
| 4,506,311 | 3/1985 | Kline | 244/1 A |

OTHER PUBLICATIONS

Amason, et al., "Randome Lightning Protection Techniques", Douglas Aircraft Company Paper, Oct. 1970.
Amason, et al., "Aircraft Lightning Protection Design Considerations", Douglas Aircraft Company Paper, Dec. 14, 1972.
Amason, et al., "Aircraft Applications of Segmented-Strip Lightning Protection Systems", Douglas Aircraft Company, Apr., 1975.

Primary Examiner—Galen Barefoot
Attorney, Agent, or Firm—Knobbe, Martens, Olson & Bear

[57] ABSTRACT

An apparatus provides lightning protection for the radome of an aircraft, or the like, by providing an electrically discontinuous path having a plurality of separated electrically conductive segments that upon exposure to a high voltage field, form an inonization channel in the air above the segments. The conductive segments are so formed that the gap separating adjacent segments is narrower along the outer, exposed surfaces of the segments than is the case between surfaces of the adjacent segments anchored to a dielectric material. Such a design ensures the electrical separation of adjoining segments while permitting the breakdown voltage between adjacent exposed surfaces to be minimized. Additionally lowering of the breakdown voltage can be obtained by providing a sequence of parallel secondary conductive segments that are separated from the primary conductive segments by a dielectric material and are so positioned as to underlie the gaps between primary segments, with an electrical connection through the separating dielectric material connecting each of the primary segments to its corresponding secondary segment.

16 Claims, 2 Drawing Sheets

LIGHTNING DIVERSION STRIPS FOR AIRCRAFT

BACKGROUND OF THE INVENTION

1. Field of the Invention

The present invention relates to apparatus for protecting aircraft radomes, antennas, and sensitive electronic equipment in aircraft from damage due to lightning strikes. More particularly, the present invention relates to lightning diversion strips that are placed on radomes or other dielectric surfaces, and, when exposed to the strong electrical fields associated with lightning, form ionized channels that conduct the current of the lightning strike directly to the metal structure of the aircraft and away from the structure and the sensitive electronic equipment housed within the radome or other dielectric structure.

2. Description of the Related Art

The operation of an exemplary lightning protection system for the radome of an aircraft, or the like, is described in U.S. Pat. No. 3,416,027 (hereinafter "the '027 patent"), the disclosure of which is incorporated herein by reference. As set forth in the '027 patent, a lightning diversion strip consists of a series of metallic or conductive segments that are positioned on a strip assembly. The complete assembly is then applied to the radome or another dielectric structure of an aircraft. The strip assemblies are electrically connected to the frame or to the metallic outer skin of the aircraft. The conductive segments are spaced apart on the strip so that the segments are separated by gaps having air or another dielectric therein.

In the presence of a high voltage field, such as that associated with a lightning strike, the air above and between the conductive segments ionizes to provide a conductive path for the electromagnetic energy of the lightning to the frame or skin of the aircraft. The lightning strike is thereby diverted across the external surface of the structure and prevented from puncturing through the wall and damaging the structure and the sensitive electronic equipment that is beneath the surface of the radome or other portion of the aircraft. Upon completion of the lightning strike process, the air in the vicinity of the conductive segments returns to the normal, non-ionized state, and will remain in that condition until the next lightning strike process is initiated. Since the high currents caused by a lightning strike are conducted to the frame or skin of the aircraft through an ionized air channel located above the metallic segments rather than through the individual metallic segments, the metallic segments remain substantially unaffected by the lightning strike and their replacement is normally not necessary, even after multiple strikes.

In typical embodiments of devices built in accordance with the '027 patent, the metallic or conductive segments of the strip assemblies are connected by an appropriate resistance material. For example, a typical resistance material has a resistance of 80,000 ohms per foot, or greater, depending upon the application. The resistance material assists in the initiation and establishment of an ionization channel or path in the air above and between the metallic segments during a lightning strike. The resistance material also helps prevent corona discharge and sparking between the metallic segments during atmospheric electrostatic and triboelectric charging (transfer of charge by particle impingement) of the aircraft during inclement weather operation, thereby preventing p-static noise interference in communication and navigation systems aboard the aircraft. Such phenomenon, if permitted to occur, would generate radio frequency noise that interferes with communication and navigation systems located aboard the host aircraft.

In a typical prior art device, the size, shape, and location of the conductive metallic segments in a strip assembly are selected in accordance with the electrical characteristics of the underlying equipment. For example, for radomes that enclose weather radar, the lightning protection strip assemblies must be transparent to the radar transmission and reception. In such cases, the maximum dimension of the metallic segments preferably should be less than approximately one-eighth the wavelength of the highest operating frequency of the radar antenna, (i.e., one-eighth of the shortest wavelength), to prevent the segments from re-radiating and causing electromagnetic interference. The spacing between the metallic segments is selected to be great enough to prevent sparking between the segments during p-static conditions, yet close enough together to establish an ionization channel above and between segments during lightning strikes. The geometric shape of the individual metallic segments may also vary, including, but not limited to, circular, square, oval, diamond, and triangular.

The '027 patent discloses a number of techniques for constructing such lightning protection strip assemblies. For example, FIG. 2 of the '027 patent discloses a strip assembly wherein individual rivets, having appropriate dimensions and spacing, are mounted to the strip assembly. FIG. 3 of the '027 patent illustrates an embodiment wherein copper wire segments, having a selected length and spacing, are applied to a neoprene layer, while the neoprene is still tacky. FIG. 4 of the '027 patent illustrates another embodiment in which metallic plate segments are mounted in a beveled channel. FIG. 5 of the '027 patent illustrates an embodiment wherein metallic segments are formed by spraying a layer of metal on a base strip, over longitudinally spaced rectangular areas.

Formation of the ionized channel is critical to the effectiveness of the strip since lightning diversion only occurs subsequent to channel formation. Lightning diversion strips built in accordance with the '027 patent have proven to be effective in creating such channels, and thereby substantially reducing the damage to dielectric structures and electronic equipment protected by such strips. Strip construction has gradually evolved so that the strips are presently being manufactured using etching techniques similar to those used in the manufacture of printed circuit boards. Such techniques enable a closer spacing between the metalized segments, which in turn causes the air above and between the metalized segments to ionize at a more favorable, i.e., lower voltage, and thus earlier in the lightning event.

When the lightning stepped leader approaches the aircraft during the preliminary phase of a lightning strike, the rapidly increasing high voltage field causes the formation of a number of different streamer channels or potential lightning pathways. The path of the lightning strike is determined by the first pathway that connects with the approaching step leader, and thus completes the "circuit." When ionization between the segments occurs at a lower voltage, the ionization path itself is formed or created in a much shorter time, thereby increasing the likelihood that the lightning strike will pass along the diverter channel rather than connecting with a streamer created within the structure, which would then cause the lightning current to pass through the radome to the sensitive electronic equipment enclosed therein. It is thus this "competition" between various electrical pathways that will determine the efficacy of a diversion system.

Etching of the copper is initiated at the upper, exposed surface, and is continued until the lower surface is breached. In order to assure that there is at least a minimum separation between copper segments, the etching of the lower copper surface is critical. However, for purposes of overall strip operation, it is the distance between the top surfaces of adjacent segments that will determine the electrical field required to establish the ionized channel. Known etching techniques for copper-clad strip assemblies are not able to sufficiently control the strip separation dimensions at both top and bottom surfaces. Consequently, the present strip assemblies are manufactured in a manner wherein the lower surface separation is deemed to be the critical factor. In order to assure achievement of a minimum gap size between individual lower conductive segments, the maximum gap size at the upper surface will vary considerably over the length of a diversion strip. The larger gap sizes in the top surface result in a higher breakdown voltage between affected segments, with all of such segments combining to create a higher breakdown voltage over the length of the diversion strip. Exemplary lightning diversion strips built in accordance with conventional techniques break down at approximately 3,000 volts per inch, whereas it is preferable that the breakdown occur in the presence of a much lower voltage field (e.g., approximately 1,000 volts per inch). Thus, a need exists for an improved lightning diversion strip having a lower breakdown voltage, and which can be constructed using techniques that lend themselves to mass production of the strips.

SUMMARY OF THE INVENTION

The present invention is an improved lightning diversion strip having a structure and method of manufacture that permits close control over both the minimum (lower surface) spacing between adjacent conductive segments and the maximum (upper surface) spacing between adjacent segments. Each of the conductive segments includes at least a first conductive layer and a second conductive layer, with each separated from first and second layers of adjacent conductive segments in a manner whereby the average distance separating the first or lower layers is greater than the average distance separating the second or upper layers. A non-conductive material, preferably a rain-erosion resistant coating, is placed between the adjacent first layers. A portion of each of the adjacent second conductive layers extends over the non-conductive material between the adjacent first layers, thereby protecting the interface surface between the metallic conductive material of the first layers and the dielectric paint. Rain impinging upon the lightning diversion strip of the present invention is prevented from directly attacking this junction, which constitutes that surface area having the greatest susceptibility to damage from the impact of rain drops.

The distance between adjacent second conductive layers is selected to encourage the formation of an ionized channel above the second conductive layers in the presence of high voltage fields during a lightning strike. As the electrical field increases, the ionized channel is created, providing an electrically conductive path across the tops of the second conductive layers for the lightning current to flow. The ability to minimize the distance between adjacent upper layers while simultaneously maintaining a sufficient, minimum gap between adjacent lower conductive layers enables the achievement of ionization channel formation at substantially lower voltage fields and thus earlier in the lightning strike event than is the case for conventional lightning diversion strips, described above.

In preferred embodiments of the present invention, the first conductive layer comprises a layer of copper. The first gap is formed in the first conductive layer by etching the copper of the first conductive layer to electrically disconnect the first conductive layer of one conductive segment from the corresponding first conductive layer of an adjacent conductive segment. Also preferably, the second conductive layer comprises copper that is electroplated to the first conductive layer.

In preferred embodiments of the present invention, a second plurality of conductive segments are disposed on the dielectric substrate on a second surface opposite the first surface. Each of the conductive segments on the second surface are electrically connected through the dielectric substrate to a corresponding conductive segment on the first surface. The electrical connection may be provided by a plated-thru via. Preferably, a layer of resistance material is applied to the second plurality of conductive segments to electrically interconnect the conductive segments forming a path having high electrical impedance.

The present invention also includes a method of manufacturing the improved lightning diversion strip. The method includes the steps of providing a dielectric substrate having a first upper metallic layer and a first lower metallic layer attached to opposite surfaces thereof. For example, the first upper and lower metallic layers advantageously comprise copper. The method further includes providing a plurality of electrical interconnections between the first upper metallic layer and the first lower metallic layer through the dielectric substrate. The electrical interconnection between the first upper metallic layer and the first lower metallic layer preferably is formed by drilling a hole through the dielectric substrate and both the upper and lower metallic layers. Thereafter, a layer of metal is electroplated between the upper and lower metallic layers, forming a conductive pathway within the hole. The method further includes a step of removing portions of the first upper metallic layer to form a plurality of first gaps in the first upper metallic layer, with the metal remaining on the substrate defining a plurality of conductive segments.

The removing step is followed by a step of applying a layer of non-conductive material, such as a rain-erosion layer of non-conductive material, such as a rain-erosion resistant coating, to fill the gaps formed between adjacent metallic segments in the first surface during the removal step. Thereafter, a layer of metallic material is electroplated over the first metallic layer. The electroplating process continues until the electroplated metallic material extends a selected distance over the non-conductive material that fills the first gaps. When the distance between electroplated layers of adjacent conductive segments is within a predetermined range of distances, leaving a plurality of second gaps between the electroplated layers, the electroplating is stopped. For example, in preferred embodiments, the range of distances is 1 milli-inches to 6 milli-inches.

Additionally, where further improvement in breakdown voltage is required, the surface of the rain-erosion resistant coating located between the conductive segments can be provided with a plurality of partially embedded metal particles.

The electroplating step is followed by a step of removing a portion of the second metallic layer from the second surface of the dielectric substrate to form a plurality of lower conductive segments that are spaced apart by a plurality of lower gaps. Thereafter, a layer of resistance material is applied to the lower conductive segments and to the second surface of the dielectric substrate to electrically interconnect the lower conductive segments along a high-impedance, electrically conductive path.

In preferred embodiments of the present invention, the method of manufacturing a lightning diversion strip further includes a step of electroplating a second metallic layer to both the first upper metallic layer and the first lower metallic layer, after the electrical interconnections between the first upper metallic layer and the first lower metallic layer have been formed, and before the first removing step.

Various other objects, advantages, and features of the present invention will become readily apparent from the ensuing detailed description, and the novel features will be particularly pointed out in the appended claims.

DETAILED DESCRIPTION OF THE PREFERRED EMBODIMENT

Figure 1:
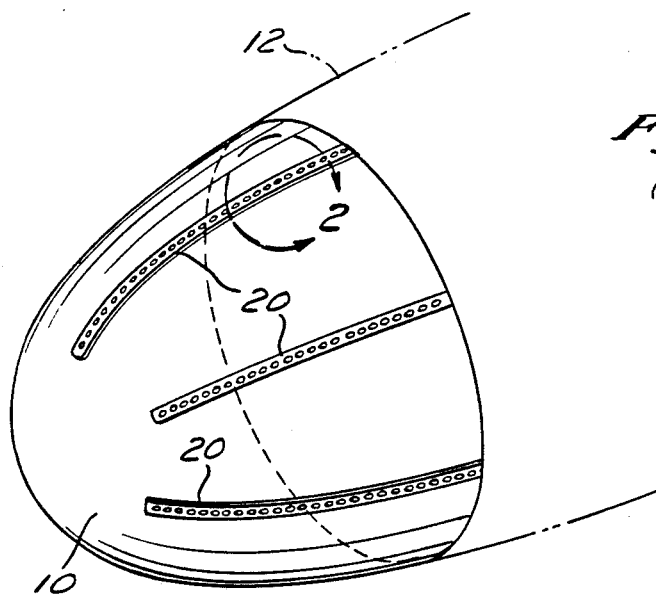
FIG. 1 is a perspective view of an exemplary airplane radome as protected by conventional prior art lightning diversion strips, with a portion of an airplane fuselage shown in phantom.

FIG. 1 is an illustration of an exemplary radome 10, as used on an aircraft 12 (partially shown in phantom). Typically, the radome 10 is mounted on the forward-most portion of the fuselage of the aircraft 12 and houses sensitive electronic equipment, such as weather radar, or the like. Because of its location at a high field gradient point of the aircraft, the radome 10 is particularly susceptible to being a site of "attachment" for lightning strikes when flying in inclement weather. Such lightning strikes can penetrate the radome and damage the radome and the sensitive equipment enclosed therein. To prevent this damage, many aircraft operators/manufacturers install a plurality of lightning diverters 20 on the surface of the radome 10, as is shown in the '027 patent. The lightning diversion strips 20 are spaced apart on the external surface of the radome 10 and are electrically connected to the fuselage of the aircraft 12.

The lightning diversion strips 20 provide a plurality of external conductive paths to the fuselage of the aircraft 12 that divert lightning strikes and prevent puncture of the radome and attachment to the sensitive equipment installed within the radome 10. Such "diversion" is effected by using the strips 20 to form external conductive pathways at an earlier time and at a lower electric field strength than is required to form the alternate pathways to the equipment within the radome 10. During the period just prior to the actual lightning strike, the lightning diversion strips 20 are designed to cause the air in their immediate vicinity to ionize, and thereby provide a relatively low impedance, electrically conductive path through the ionized air above the strips to the external surface of the fuselage of the aircraft 12.

Figure 2:
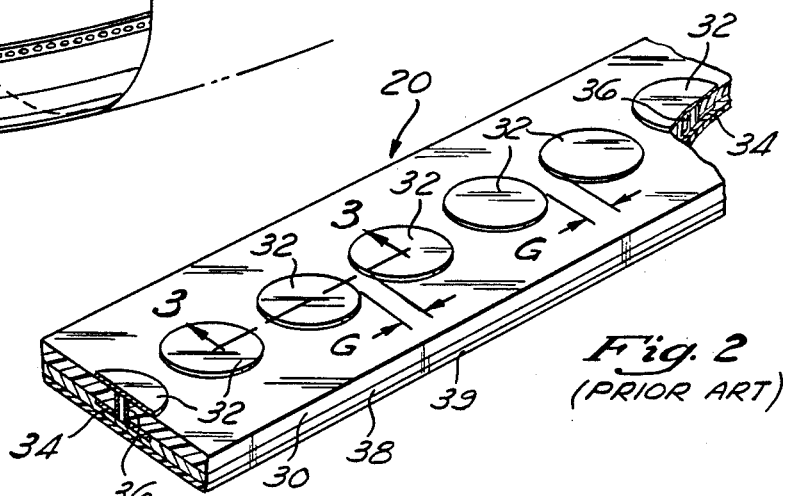
FIG. 2 is an enlarged fragmentary view of a section of the lightning diversion strip taken from the encircled area indicated at 2 in FIG. 1.
Figure 3:
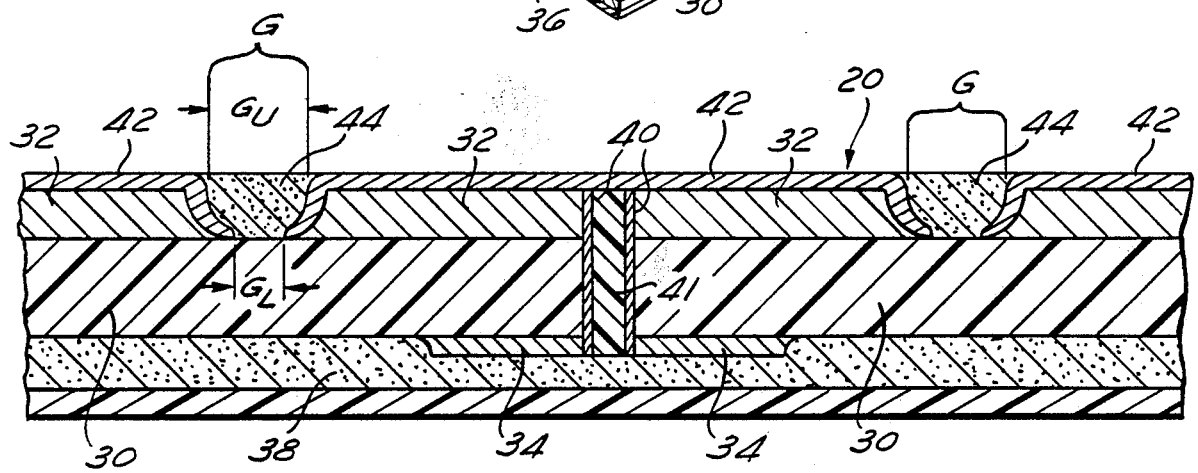
FIG. 3 is a cross-sectional view of the lightning diversion strip of FIG. 2, taken along the lines 3—3 in FIG. 2.

A section of an exemplary lightning diversion strip 20 is illustrated in FIGS. 2 and 3. The lightning diversion strip 20 comprises a dielectric substrate 30 having a plurality of spaced-apart upper conductive segments 32 formed on the upper side of the dielectric substrate 30 and having a corresponding number of smaller lower conductive segments 34 formed on an opposite or lower side of the dielectric substrate 30. (As used herein "upper" refers to the surface of the strip 20 that is exposed when mounted on the radome 10 (FIG. 1) and "lower" refers to the surface of the strip 20 that is proximate to the surface of the radome 10.) The upper conductive segments 32 and the lower conductive segments 34 are electrically connected by a plurality of corresponding plated-thru vias 36 in the dielectric substrate 30. A layer of resistance material 38 is applied to the lower surface of the dielectric material 30 to electrically interconnect the lower conductive segments 34. A layer of insulating material 39, such as neoprene, is advantageously applied to the resistance material 38 to insulate the resistance material 38 and to provide mechanical protection when the lightning diversion strip is attached to the radome 10.

As will be described more fully below, the upper and the lower conductive segments 32, 34 and the plated-thru vias 36 may be constructed by conventional printed circuit board techniques. For example, the conductive segments 32, 34 are advantageously formed by starting with printed circuit board material having copper cladding bonded to both sides of the dielectric substrate 30. The conductive segments 32, 34 are formed by etching a portion of the copper cladding from both sides, leaving only that copper material required to form the conductive segments 32, 34.

The upper conductive segments 32 and the corresponding lower conductive segments 34 are electrically interconnected by the vias 36 formed in the dielectric substrate 30. Each of the vias 36 consists of a through-bore formed in the upper conductive segment 32, the lower conductive segment 34, and the dielectric substrate 30, with a plated layer 40 of copper on the inside portion of the hole to provide an electrical interconnection. Preferably, a central core 41 of epoxy or other suitable material is formed within the throughbore after the plating process has been completed. Additionally, the upper conductive segments 32 preferably are plated with a layer 42 of nickel, or other suitable material, to protect the upper conductive segments 32 from corrosion and erosion.

As set forth in the '027 patent, the resistance material 38, interconnecting the lower conductive segments 34, assists in the initiation and establishment of an ionization channel or path adjacent to the strip assembly during a lightning strike. The resistance material 38 also helps prevent corona discharge and sparking between the upper conductive segments 32 during electrostatic and triboelectric charging (transfer of charge by particle impingement) of the upper metalized segments 32. The use of the resistance material 38 prevents the lightning diversion strips 20 from generating radio frequency (R.F.) noise that can interfere with the communication and navigation systems aboard the aircraft on which the strips 20 are mounted.

As illustrated in FIGS. 2 and 3, the upper conductive segments 32 are spaced apart by gaps G, representing the area where the copper has been removed during the etching process. Preferably, as illustrated in FIG. 3, the gap G is filled with a non-conductive coating 44, or another non-conductive, rain-erosion resistant material, to protect the exposed portions of the dielectric substrate 30. The coating 44 also reduces the breakdown voltage between two adjacent upper conductive segments 32. It is well known that the surface flashover voltage of a smooth dielectric, such as the coating 44, is approximately one-third to two-thirds that of the breakdown voltage through air. Thus, an ionization path through the adjacent air will be created at a lower voltage than if the gaps G had only air as the dielectric material.

As set forth in the '027 patent, the sizes of the upper conductive segments 32 are selected so that the largest dimension is less than one-eighth of the wavelength of the radio frequency signals generated by the electronic equipment within and protected by the radome 10. For example, if the underlying equipment is a type of commonly used weather radar, operating at a frequency of 9.375 GHz (gigahertz), the wavelength is approximately 32 millimeters (1.26 inches). Diversion strips 20 suitable for protecting a radome 10 housing such weather radar equipment could provide circular, upper conductive segments 32 having a diameter selected to be less than 3.8 millimeters (0.15 inches).

After selecting the appropriate dimension for the upper conductive segments 32, as discussed above, the gap G is selected to electrically isolate the adjacent metalized upper segments 32. As is well known in the art, the size of the gap G determines the voltage at which the dielectric surface will flashover and initiate the ionization between adjacent upper metalized segments 32. For example, with a gap size of 10 milli-inches between upper conductive segments 32 of 0.15 inches in diameter, the breakdown voltage is approximately 3,000 volts per inch.

For reasons that will be briefly discussed hereinafter, a breakdown voltage of 3,000 volts per inch essentially represents the limit of the presently available lightning diversion strips. This voltage thus represents the ultimate design criteria, determining the possible shapes and sizes of the radomes and the placement of the electronic equipment therein. Until recently, the 3,000 volts per inch limitation was satisfactory for almost all applications for the diversion strips. However, as radomes and the associated electronic equipment installations become both increasingly sensitive and increasingly important in the new airplane designs, and as the aircraft designs become less conventional and use higher frequency equipment, diversion strips having such high breakdown voltages (3,000 volts/inch) do not provide adequate lightning protection. In order to better protect the radomes and the electronic equipment housed within the radome 10 (FIG. 1), a lower voltage breakdown per unit length is desirable.

It has been found that conventional printed circuit manufacturing techniques do not provide a satisfactory means for achieving lower breakdown voltages. This problem can be better understood by referring to FIG. 4, which illustrates an exemplary conventional printed circuit board technique for constructing the gaps G. The substrate 30 is shown with a copper layer 60 bonded to it. As is well known, the copper layer 60 is etched by applying an etching chemical 62 to the copper layer 60. In order to prevent the entire copper layer 60 from being removed from the substrate 30, the portions of the copper layer 60 that are to remain after the etching process, (forming the upper conductive segments 32), are protected with a layer of a conventional etchant-resistant material 64. The areas where etching is to occur are determined by the areas where the etchant-resistant material 64 has been removed. For example, in FIG. 4, a portion of etchant-resistant material 64 has been removed, permitting a gap W to be formed in the resistant material 64.

When the etching chemical 62 is applied, it contacts the copper layer 60 through the gap W in the etchant-resistant chemical layer 64. The etching chemical 62 will remove copper at a rate that is determined by a number of well-known variables, including the strength of the etching chemical 62 and the temperature at which the etching occurs. A gap at the dielectric substrate 30 will have a width $G_L$ (representing the lower gap) that is determined by the width of the gap W formed in the etchant-resistant material 64 and by the amount of time that the etching material 62 is allowed to interact with the copper layer 60. The etching chemical 62 will also typically etch the copper layer 60 at an equal rate in all directions from the starting location. Thus, as the copper layer 60 is removed towards the substrate 30, the copper layer 60 will also be removed beneath the etchant-resistant material 64 proximate to the gap W. If it is assumed that the copper layer 60 has a depth R, in the time that it takes the etching chemical 62 to remove the copper overlying the substrate 30 beneath the gap W, the etching chemical 62 will also remove copper in all other directions away from the gap W.

If the etching process is timed (or observed) so that the copper layer 60 is removed just to the surface of the dielectric substrate 30, the lower gap $G_L$ will have a width substantially equal to the width of the gap W in the etchant-resistant material 64. At the same time, an upper gap $G_U$ will be formed having a width substantially equal to the width of the gap W plus twice the depth of the copper layer 60 (i.e., $G_U = W + 2R$). In an exemplary embodiment, wherein the depth R of the copper layer 60 is 5 milli-inches, and wherein a minimum width of the lower gap $G_L$ is 1 milli-inch, one can readily see that the minimum upper gap $G_U$ is approximately 11 milli-inches. A longer etching time will result in a wider lower gap $G_L$ and a wider upper gap $G_U$. A shorter etching time will result in a narrower upper gap $G_U$, but may not provide sufficient time for the etching chemical 62 to etch through to the dielectric substrate 30. If the copper layer 60 is not etched through to the substrate 30, two adjacent upper conductive segments 32 will be electrically connected, and will not be transparent to the radar. Furthermore, a lightning strike will be conducted through metal between the segments 32 rather than through an ionized path.

Since the lightning diversion strips 20 are typically formed in lengths of approximately four feet, and since the rate at which the etching process occurs can vary by as much as ±10% over a four-foot length of printed circuit board material, it has been found that a minimum width of the lower gap $G_L$ of at least 1 milli-inch will result in a width of the upper gap $G_U$ of approximately 12 milli-inches in an exemplary embodiment. Although it would be preferable to have a much narrower upper gap $G_U$ to reduce the breakdown voltage and enable usage of such strips in more advanced applications, as described above, attempts to narrow the upper gap $G_U$ using the conventional printed circuit board techniques described herein, pose the increased possibility of failing to etch all the way to the dielectric substrate 30, and thus failing to electrically isolate adjacent upper conductive segments 32. For the reasons set forth above, it has been found that a breakdown voltage of approximately 3,000 volts per inch is the lowest voltage that is practically achievable using conventional printed circuit board techniques.

The rain erosion protection provided by the rain-erosion resistant coating 44 (FIG. 3) presents additional problems with the presently available lightning diversion strips 20. As previously described, the rain-erosion resistant coating 44 is applied to the gaps G to prevent rain from impinging directly on the exposed portion of dielectric substrate 30, as well as to provide a dielectric surface path between adjacent upper conductive segments 32 that has a lower flashover voltage than an air gap. As illustrated in FIG. 3, there is an irregular interface between the rain-erosion resistant coating 44 and the nickel plating 42. Although the rain-erosion resistant coating 44 will initially flow to conform itself to the irregular surface of the nickel plating 42, the coating 44 does not have the same thermal expansion and contraction coefficients as the nickel plating 42. Changes in the ambient temperature, (which changes in absolute terms can be as large as 150° F.), can cause cracks to form in the interface between the nickel plating 42 and the rain erosion resistant coating 44. Rain impinging upon these cracks at the high impact levels occurring during flight can cause the coating 44 to disengage from the nickel plating 42 and to become eroded. Eventually, a sufficient amount of the coating 44 may become eroded to expose the surface of the dielectric substrate 30 at the lower gap $G_L$. The rain will then directly impinge on the surface of the dielectric substrate 30 and may result in damage to the bond between the metalized segments 32 and the dielectric substrate 30. Furthermore, erosion of the coating 44 can affect the breakdown voltage between adjacent upper metalized segments 32. Although the surface flashover voltage of a dielectric, such as the coating 44, is approximately one-third to two-thirds the breakdown voltage across an air gap, this effect is substantially degraded if the surface of the coating 44 is made irregular by rain erosion. If rain erosion causes the destruction of the smooth dielectric surface across the coating 44, the breakdown voltage between adjacent upper conductive segments 32 can increase substantially.

In order to lower the breakdown voltage and to eliminate the present rain impingement problems with the rain-erosion resistant coating 44, a need exists for an improved lightning diversion strip 20 and a method for the manufacture of such strips. The present invention provides an apparatus and method for substantially reducing the breakdown voltage of the lightning diversion strips 20 and thus affording protection to the radome and the sophisticated electronic equipment housed within radomes of more advanced designs. The present invention is described below with reference to FIGS. 5 and 6.

Figure 5:
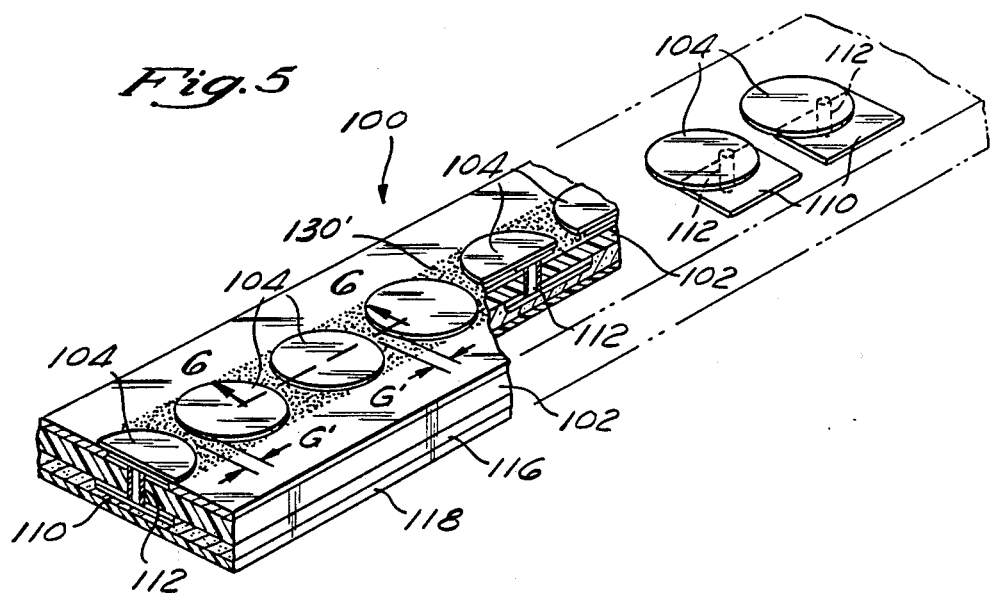
FIG. 5 is a perspective view of a section of an exemplary lightning diversion strip constructed in accordance with the present invention with portions broken away and portions in phantom.

FIG. 5 illustrates a section of a lightning diversion strip 100 built in accordance with the present invention. As with the prior art, the lightning diversion strip 100 includes a dielectric substrate 102 that advantageously is constructed from printed circuit board material, initially having a layer of copper cladding on each of its two principal sides (i.e., the first or upper and the second or lower sides as positioned in FIG. 5). The dielectric substrate 102 supports a plurality of first conductive segments 104 on its upper surface and a plurality of second conductive segments 110 on its lower surface. The structure of the first conductive segments 104 is substantially different from that found in the prior art devices and will be described more fully hereinafter in connection with FIG. 6.

In preferred embodiments of the present invention, each of the first conductive segments 104 has a circular shape, (circular is shown, although, again, many other shapes, including eliptical, could be selected), and has a diameter selected to be less than one-eighth of the wavelength of the highest operating frequency of the electronic equipment to be protected by the lightning diversion strip 100. Adjacent first conductive segments 104 are spaced apart from one another by a plurality of gaps G' having widths between adjacent first conductive segments 104 that are selected to be sufficiently large to provide electrical isolation between adjacent first conductive segments 104, yet having a sufficiently narrow width so that the breakdown voltage between adjacent first conductive segments 104 is substantially less than that achievable by utilization of the minimum width presently obtainable using the conventional methods described above.

Each of the first conductive segments 104 is preferably electrically connected to a corresponding second conductive segment 110. The electrical interconnection between a first conductive segment 104 and its corresponding lower conductive segment 110 is provided through the dielectric substrate 102 by means of a via 112. A resistance material layer 116 is applied to the lower surface of the dielectric substrate 102 and to the second conductive segments 110 to provide a high resistance electrical interconnection between the adjacent second conductive segments 110. A protective coating 118, advantageously of polyurethane, covers the resistance material layer 116 to prevent damage to the resistance layer 116 during the installation and the use of the diversion strip 100. A rain-erosion resistant coating layer 130, or a layer of other suitable material, is applied to the top surface of the dielectric substrate 102 and surrounds the first conductive segments 104. In a preferred embodiment, a plurality of micron size metal particles 130' are partially embedded in the coating layer 130 to further improve the breakdown voltage. Sufficient corrosion-resistant, non-corrosive metal particles, (nickel-like), are provided to effect this breakdown enhancement, but not enough to create an electrically conductive coating. The particular structural interrelationship between the rain-erosion resistant coating 130 and the first conductive segments 104 is part of the invention described herein, and will be described more fully below.

Figure 6:
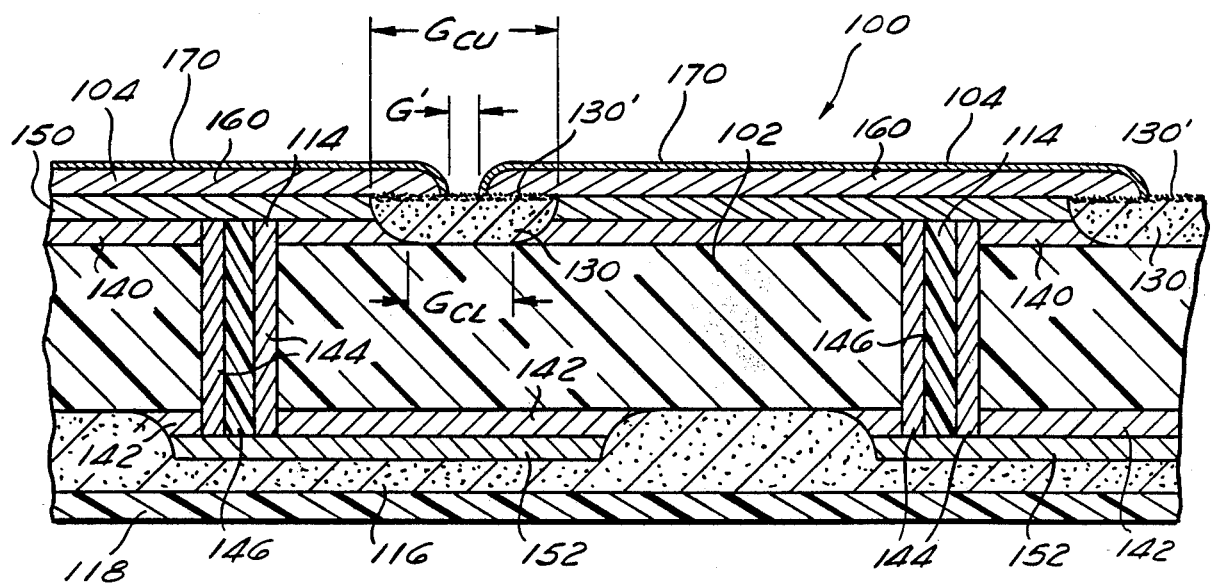
FIG. 6 is a cross-sectional view of the lightning diversion strip of FIG. 5, taken along the lines 6—6 in FIG. 5, showing details of the construction of the lightning diversion strip of the present invention.

Referring now to FIG. 6, an exemplary cross-section of the lightning diversion strip 100, taken along the line 6—6 in FIG. 5, is presented. As shown in FIG. 6, the lightning diversion strip 100 is generally similar to the known multi-segment lightning diversion strip 20 shown in FIGS. 2, 3, and 4. However, significant differences in the structure of the lightning diversion strip 100 of the present invention enable the lightning diversion strip 100 to be built with a substantially smaller gap between adjacent first conductive segments 104, thereby obtaining a substantially lower breakdown voltage per unit length. Additionally, the problem previously described with respect to the degradation of the rain-erosion resistant coating due to the impact of rain drops is substantially reduced or eliminated.

The structure of the lightning diversion strip 100 now will be described in connection with a method of constructing the lightning diversion strip 100. As set forth above, the lightning diversion strip 100 is constructed from the dielectric substrate 102, having a first (upper) layer 140 and a second (lower) layer 142 of copper cladding. Although shown by FIG. 6 in the structure existing after etching, one skilled in the art will understand that the first (upper) copper layer 140 and the second (lower) copper layer 142 initially are solid layers of copper on the two principal sides of the dielectric substrate 102. For example, in a preferred embodiment of the lightning diversion strip 100, the dielectric substrate 102 comprises, by way of example and not by way of limitation, epoxy fiberglass having a thickness within the range of approximately 5–12 milli-inches (0.12 to 0.3 mm). Recent testing indicates that the lower range of thicknesses provides improved breakdown voltage characteristics. Approximately 1.4 milli-inches (0.035 mm) of copper is bonded to the upper and lower principal sides of the dielectric substrate 102 to form the first (upper) copper layer 140 and the second (lower) copper layer 142, respectively.

The first step in the manufacture of the lightning diversion strip 100 of the present invention is to form, such as by punching, by drilling, or by laser energy, a plurality of holes through the first (upper) copper layer 140, the dielectric substrate 102 and the second (lower) copper layer 142 to define the locations of the vias 112. Thereafter, a layer of copper is plated in the hole of each of the vias 112 in a conventional manner to form an electrically conductive tube having a copper wall 144. For example, in a preferred embodiment, the via 112 is plated until the copper wall 144 is approximately 1.4 milli-inches (0.035 mm) thick. Thereafter, the cavity within the copper wall 144 is filled with a structural epoxy plug 146 so that the center portion of the via 112 is flush with the surface of the first (upper) copper layer 140 and flush with the second (lower) copper layer 142.

After forming the vias 112, a first outer copper layer 150 and a second outer copper layer 152 are plated over the first (upper) layer 140 and the second (lower) copper layer 142, respectively, covering the vias 112. For example, the first outer copper layer 150 and the second outer copper layer 152 advantageously have thicknesses of approximately 1.4 milli-inches (0.035 mm).

After overplating the vias 112 with the first outer copper layer 150 and the second outer copper layer 152, the first outer copper layer 150 is covered with an etchant-resistant material (not shown). A portion of the etchant-resistant material is removed to form a mask that defines the first conductive segments 104. The second outer copper layer 152 is masked with an etchant-resistant material (not shown). At this time, no portion of the etchant-resistant material that covers the second outer copper layer 152 is removed. The first (upper) copper layer 140 and the first outer copper layer 150 are etched by placing the lightning diversion strip 100 in an etching chemical (not shown). The etching chemical interacts with the portions of the first (upper) and first outer copper layers 140, 150 that have not been protected by the etchant-resistant material and removes a portion of the copper in the first outer copper layer 150 and the first (upper) copper layer 140 to form a plurality of gaps in the two layers, exactly as described above with respect to the copper layer of the prior art. As illustrated in FIG. 6, each gap has a lower gap width, shown as $G_{CL}$, proximate to the dielectric substrate 102 and an upper gap width, shown as $G_{CU}$, proximate to the top surface of the upper copper layer 150. The etching time is controlled such that the upper gap width $G_{CU}$ is approximately 8–9 milli-inches (0.2 mm). Unlike the gap etched in the prior art devices described above, the gap etched in the first upper copper layer 140 and the first outer copper layer 150 does not determine the voltage breakdown, and precise control of the width of this gap formed in the copper layers 140, 150 is not critical to the present invention.

After forming the gap in the first upper and first outer copper layers 140, 150, the etchant-resistant material is removed from the remaining non-etched portions of the first outer copper layer 150. Thereafter, the top surface of the lightning diversion strip 100 is coated with the rain-erosion resistant coating layer 130. The coating layer 130 fills the etched gaps formed in the copper layers 140, 150 as illustrated in FIG. 6. After the coating layer 130 has hardened, the exposed surface of the first outer copper layer 150 is cleaned by abrasive techniques, or the like, whereby no rain-erosion coating remains on that surface, and the top, exposed surface of the erosion resistant layer 130 is coplanar with the top, exposed surface of the first outer copper layer 150.

After cleaning the top surface of the first outer layer 150, a layer of copper is plated onto the surface of the upper copper layer 150 to form a button-shaped top layer 160 that defines the first conductive segment 104 shown in FIG. 5. As the plating process progresses, the top copper layer 160 will increase in depth over each of the second upper copper layers 150. In addition, the top copper layer 160 will expand over the coating layer 130 that fills the gaps in the copper layers 140, 150. Thus, the gaps between adjacent segments in the top layer 160 will gradually become smaller than the corresponding gaps in the copper layers 140, 150. Preferably, the plating process is an electroplating process that is allowed to continue until the gap between adjacent button-shaped top layers 160 is closed to a width of approximately 1–6 milli-inches (0.03–0.16 mm). The width of this gap is shown as G' in FIG. 6. Since the process used to form the button-shaped top layer 160 is an electroplating process, it is subject to closer control of tolerances than is the etching process. It is possible to control the gap size between adjacent button-shaped top layers 160 with much greater accuracy than the etching process permits with respect to the copper layers 140, 150, described above. Since the gap is considerably narrower than was obtainable using the conventional etching process (i.e., 1-6 milli-inches versus 10-12 milli-inches), the breakdown voltage between adjacent button-shaped top layers 160 across the surface of the coating layer 130 is considerably lower. For example, an exemplary lightning diversion strip 100, built in accordance with FIG. 6, has a breakdown voltage of approximately 1,000 volts per inch, compared with the breakdown voltage of approximately 3,000 volts per inch for the conventional device described in accordance with FIGS. 2-4.

After the button-shaped top layer 160 has been plated to form the desired gap width, the top layer 160 is cleaned and then plated with a thin layer 170 of nickel or other protective material. For example, in preferred embodiments, the thin nickel layer 170 is electroplated to the top layer 160 to a thickness of 0.3-1.0 milli-inches (0.0076-0.025 mm).

After forming the button-shaped top layers 160, the etchant-resistant material protecting the second outer copper layer 152 is removed and replaced with an etchant-resistant material that is masked to define the second conductive segments 110. In contrast, the entire top surface of the lightning diversion strip 100 is masked for protection with an etchant-resistant material. An etching chemical is applied as before to etch gaps in the second (lower) copper layer 142 and the second outer copper layer 152 in the areas not protected by the etchant-resistant material. In the preferred embodiment described herein, the second conductive segments 110 defined by the gaps etched in the copper layers 142, 152 are structurally offset from the first conductive segments 104. For example, as illustrated in FIG. 6, a portion of the second conductive segment 110 lies directly below the gap formed in the first copper layers 140, 150. This offset changes the electrical field distribution across the dielectric substrate 102 and improves (i.e., lowers) the initial voltage breakdown characteristics of each gap, and thus enhances the ionization characteristics of the entire strip assembly.

After forming the gaps that define the second conductive segments 110, the etchant-resistant material is removed from the button-shaped top layer 160, the coating layer 130, and the second outer copper layer 152, and the layers are thoroughly cleaned. Thereafter, a mixture of resistance material, having desired electrical resistance characteristics, is coated over the second conductive segments 110 of the diversion strip 100 covering the second conductive segments 110 and forming the resistance material layer 116. The resistance material layer 116 is then baked to harden it, and the polyurethane protective coating layer 118 is thereafter applied over the resistance material layer 116 to protect the layer 116 from damage during the installation and use of the lightning diversion strip 100.

Figure 4:
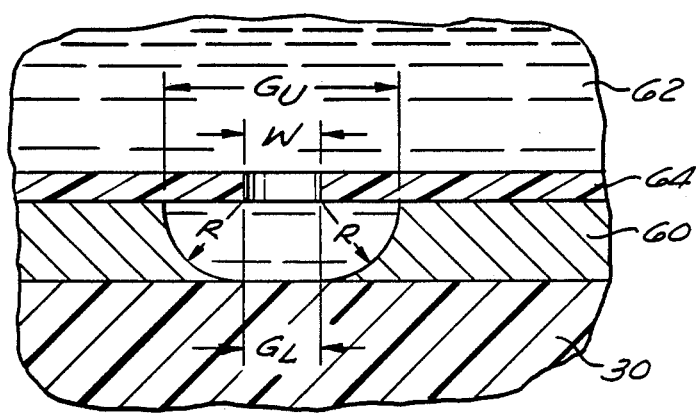
FIG. 4 is a cross-sectional view of an exemplary prior art lightning diversion strip showing the etching process wherein a portion of the copper cladding is removed to form a gap between adjacent conductive segments.

In addition to having the improved breakdown voltage characteristics described above, the lightning diversion strip 100 of FIGS. 5 and 6 has the further improved characteristic that the button-shaped top layer 160, partially overlies the rain-erosion resistant coating layer 130. The overhanging portion of the button-shaped copper layer 160 protects the interface between the coating layer 130 and the first copper layers 140, 150. Rain impinging upon the lightning diversion strip 100 cannot strike directly at that interface and weaken the bond between the coating layer 130 and the first copper layers 140, 150, and there is little or no tendency for the coating layer 130 to become eroded as described previously with respect to the conventional lightning diversion strip 20 (FIGS. 2-4). Thus, the surface of the coating layer 130 between adjacent button-shaped top layers 160, whether or not the partially embedded metal particles 130' are provided, retains its integrity and provides a relatively constant surface flashover voltage across the gap between the button-shaped top layers 160.

Although the preferred embodiment of the present invention has been illustrated and described above, modifications within the scope of the invention may be apparent to those skilled in the art. Therefore, the true scope of the invention is understood to be determined by the appended claims.

What is claimed is:

1. A lightning diversion strip comprising:
a dielectric substrate supporting a plurality of conductive segments on a surface thereof, each said segment comprising a first conductive layer and a second conductive layer, said first conductive layer of one segment spaced apart from the first conductive layer of an adjacent conductive segment by a first gap having a first width determined by the distance between adjacent first conductive layers, said first gap filled with a non-conductive material, said second conductive layers spaced apart by a second gap having a second width less than said first width, a portion of each said second conductive layer formed over said non-conducting material in said first gap so that a junction between said non-conducting material and said first conductive layers is covered by said second conductive layer, said second width of said second gaps selected so that ionization occurs between adjacent second conductive layers in the presence of high voltage electricity during a lightning strike, said ionization providing an electrically conductive path across the tops of said second conductive layers to thereby conduct current caused by said high voltage electricity along said electrically conductive path.

2. The apparatus as defined in claim 1, wherein said first conductive layer comprises copper, and wherein said first gap is formed by etching said copper of said first conductive layer to electrically disconnect the first conductive layer of one conductive segment from the corresponding first conductive layer of an adjacent conductive segment.

3. The apparatus as defined in claim 2, wherein said second conductive layer comprises copper electroplated to said first conductive layer.

4. The apparatus as defined in claim 2, and further comprising a plurality of metal particles partially embedded in and retained by an exposed surface of said non-conductive material.

5. The apparatus as defined in claim 1, further including a second plurality of conductive segments disposed on said dielectric substrate on a surface of said dielectric substrate opposite said first surface of said dielectric substrate, each conductive segment in said second plurality of conductive segments electrically connected through said dielectric substrate to a corresponding one of said first plurality of electrically conductive segments.

6. The apparatus as defined in claim 5, further including a layer of resistance material applied to said second plurality of conductive segments to electrically interconnect said second plurality of electrically conductive segments.

7. The apparatus as defined in claim 1, wherein said second gap has a width in the range of 1 milli-inches to 6 milli-inches.

8. A method of manufacturing a lightning diversion strip, comprising the steps of:
providing a dielectric substrate having a first upper metallic layer and a first lower metallic layer attached to first and second surfaces, respectively, thereof;
providing a plurality of electrical interconnections between said first upper metallic layer and said first lower metallic layer through said dielectric substrate;
removing portions of said first upper metallic layer to form a plurality of gaps in said first upper metallic layer to define a plurality of conductive segments on said first upper metallic layer;
applying a layer of non-conductive material to said first surface of said dielectric substrate to fill said gaps in said first upper metallic layer;
electroplating an electroplated layer of metallic material over said first upper metallic layer to cover said first upper metallic layer, said electroplating step continuing until said electroplated metallic material extends over said non-conductive material in said gaps;
stopping said electroplating step when the distance between said electroplated layers of adjacent conductive segments is within a predetermined range of distances;
removing a portion of said first lower metallic layer from said second surface of said dielectric substrate to form a plurality of lower conductive segments spaced apart by a plurality of lower gaps; and
applying a layer of resistance material to said lower conductive segments and said second surface of said dielectric substrate to electrically interconnect said lower conductive segments.

9. The method as defined in claim 8, wherein said range of distances is 1 milli-inches to 6 milli-inches.

10. The method as defined in claim 8, and further comprising: forming an electrical interconnection between said upper metallic layer and said lower metallic layer.

11. The method as defined in claim 10, wherein said electrical interconnection between said upper metallic layer and said lower metallic layer is formed by drilling a hole through said upper metallic layer, said dielectric substrate and said lower metallic layer, and electroplating a layer of metal between said upper metallic layer and said lower metallic layer within said hole.

12. The method as defined in claim 11, wherein a second upper metallic layer and a second lower metallic layer are electroplated to said first upper metallic layer and said first lower metallic layer before said first removing step and said second removing step.

13. The method as defined in claim 12, wherein said non-conductive material applied to said upper surface of said dielectric substrate is a rain-erosion resistant coating.

14. The method as defined in claim 8, and further comprising the step of:
distributing a plurality of metal particles upon an exposed surface of the layer of non-conductive material and partially embedding said metal particles therein.

15. The method as defined in claim 14, wherein said metal particles are distributed over those surface areas of said non-conductive material as are located between adjacent pairs of the upper conductive segments.

16. An improved lightning diversion strip of the type having a plurality of separated electrically conductive segments anchored to a dielectric strip of material, wherein the improvement comprises:
a plurality of first conductive segments, adjacent segments separated a first distance at an exposed outer surface and a second distance at an inner surface adjacent the dielectric strip, said second distance greater than said first distance; and
a plurality of second conductive segments separated from one another and from the first plurality of conductive segments, each of said second conductive segments corresponding to and electrically connected to a separate one of said first conductive segments, forming a parallel pair of conductive elements, said second conductive elements offset with respect to their related first conductive element, with a portion of each of said second conductive element underlying a gap separating adjacent first conductive segments.

* * * * *